United States Patent Office 3,364,277
Patented Jan. 16, 1968

3,364,277
DEHYDROGENATING OLEFINS TO DIOLEFINS IN THE PRESENCE OF A YELLOW IRON OXIDE CATALYST
Roy C. Siem, Concord, Calif., assignor to Shell Oil Company, New York, N.Y., a corporation of Delaware
No Drawing. Filed May 21, 1965, Ser. No. 457,819
5 Claims. (Cl. 260—680)

ABSTRACT OF THE DISCLOSURE

Dehydrogenation of olefins to diolefins in the presence of a catalyst of specific percentage composition obtained by calcining a mixture of mono-hydrated yellow iron oxide, chromium oxide, potassium carbonate and water.

This invention relates to an improved process for the catalytic dehydrogenation of olefins at high temperatures and in the presence of steam. More particularly this invention relates to an improved process for the preparation of butadiene by the catalytic dehydrogenation of butylene in the presence of a new and improved catalyst.

Because of the importance of butadiene in the preparation of synthetic rubbers and resins considerable research has been directed to various methods for preparing this compound and to improve known methods resulting in increased yields of butadiene from butylenes.

The dehydrogenation reaction most usually employed is to pass the olefin reactant diluted with 2 to 30 moles of steam per mole of reactant over a dehydrogenation catalyst at a temperature of about 580° to 700° C. at a low pressure, e.g., subatmospheric to about 30 p.s.i.g. The class of catalyst found to be most effective for this process is an alkalized iron oxide containing a small amount of another heavy metal oxide more difficultly reducible than iron oxide. The catalyst is usually a potassium carbonate promoted iron oxide (calculated as $Fe_2O_3$) containing a small but stabilizing amount of chromium oxide (calculated as $Cr_2O_3$). Catalysts containing various ratios of iron oxide, potassium carbonate and chromium oxide have been used. One of the major advantages of these catalysts is that they are auto-regenerative under reaction conditions in the presence of steam. This obviates the necessity of interrupting the process and regenerating the catalysts, such regeneration including the burning of the carbon deposits off the surface of the catalyst particles, which is necessary with other dehydrogenation catalysts. One of the disadvantages of these catalysts is that the selectivity (moles of desired product produced per mole of reactant reacted) of the reaction varies inversely with the conversion (moles of reactant reacted). Thus any improvement which results in increasing either the selectivity or the conversion without lowering the other is economically very attractive since this means that the yields (moles of desired product produced per mole of reactant) of the product has been increased. There are two ways of measuring the efficiency of the reaction and activity of the catalyst. One is determined by adding the percentages of selectivity and conversion to obtain the conversion selectivity value (CSV) and the other is to measure the yield which is the product of the conversion and selectivity expressed in percentage. Any increase in the numerical value of either the CSV or yield results in a more efficient operation and means that more reactant is being converted into the desired product. In a commercial operation, many of which produce millions of pounds of product each week, an increase of only one or two percentage points in the CSV or yield indicates a substantial net increase in plant production.

The iron oxide used in catalyst preparation is extremely critical in terms of catalyst performance. The iron oxide usually employed in catalyst preparation is a synthetically produced powdered red, red-brown or black pigment. The red or red-brown pigments are highly pure ferric oxide. The black pigment is the magnetite form of iron oxide-ferrosoferric oxide ($Fe_3O_4$), which is usually the form found in the catalyst under reaction conditions. The iron oxide in the catalyst is, however, calculated as $Fe_2O_3$. These oxides are prepared by various methods, e.g., the oxidation of iron compounds by roasting, precipitation, calcination, etc. Whatever method is used the final step is usually the application of substantial heat to remove all or substantially all of the water from the oxide thereby producing an oxide red or red-brown in color. It is known that the most active and selective catalysts are those having an available surface area below 10 square meters per gram and in many cases below 5 square meters per gram. Since iron oxides have surface areas in excess of this requirement, many methods have been employed to reduce their available surface area. One of the most common is the precalcination of the iron oxide at a temperature in excess of 700° C. for a period of time ranging from one half hour to several hours. Other methods are involved in catalyst preparation. For example, one method is to add Portland cement to the catalyst components followed by calcination at about 600° C. thereby lowering the surface area by plugging pores in the catalyst by cement as well as by calcination. Another method reduces the available surface area by calcination of the catalyst at 800 to 1000° C.

It is an object of this invention to provide a new and improved dehydrogenation catalyst containing alkalized iron oxide wherein the iron oxide used need not be dried or calcined to remove substantially all of the water of hydration prior to catalyst formulation.

It is also an object of this invention to provide an improved process for the dehydrogenation of olefins to diolefins utilizing a new potassium promoted iron oxide catalyst whereby increased yields of product and higher CSV's are attained. Other objects and advantages of the invention will become apparent from the following detailed description thereof.

It has now been found that substantially improved catalysts particularly effective in catalyzing the dehydrogenation of olefins to diolefins are obtained by using a yellow iron oxide as a starting material in catalyst preparation instead of the red or red-brown iron oxides usually used in preparing iron oxide-chromium oxide-potassium carbonate dehydrogenation catalysts.

In its broad aspect, this invention relates to novel dehydrogenation catalysts prepared by combining a yellow iron oxide, chromium oxide and potassium carbonate and to a method of using these catalysts in the catalytic dehydrogenation of olefins to diolefins. These novel catalysts are particularly effective in the catalytic dehydrogenation of butylene to butadiene and of tertiary amylenes to isoprene.

In accordance with the present invention, olefins are converted to diolefins by contacting the olefin and steam in a molar ratio of about 1:2 to 1:20 with a dehydrogenation catalyst described below at a temperature of from about 550° to about 700° C. The catalyst contains from about 55 to 70 percent by weight iron oxide, 30 to 40 percent by weight potassium carbonate and 1.5 to 5 percent by weight chromium oxide and is prepared by combining yellow iron oxide, potassium carbonate, chromium oxide and water to form a paste, extruding the paste to form pellets and drying the pellets. If preferred, the dried pellets may be calcined at an elevated temperature of about 600° to 650° C.

While it is not known just what effect the yellow iron oxide has upon the catalyst that makes it different from prior art catalysts of the same composition, it is known, as will be demonstrated, that the catalysts prepared from yellow iron oxide produce superior results in the dehydrogenation of olefins to diolefins and especially butylene to butadiene.

Yellow iron oxide appears in a variety of colors ranging from a light yellow to a deep yellow-orange. These yellow iron oxides are the hydrated form of ferric oxide and are essentially ferric oxide monohydrate. The water of hydration in yellow iron oxides is usually about 13 percent by weight. These oxides may be prepared by the controlled oxidation of iron in ferrous sulfate solutions such as disclosed in U.S. Patent 2,111,726 to G. Plews and dated Mar. 22, 1938.

While not wishing to be limited to any theory as to what makes the dehydrogenation catalysts prepared from yellow iron oxide superior to those of the prior art, it is believed that the water of hydration may have a significant effect. The physical characteristics of the yellow oxide catalysts are somewhat different than red oxide catalysts having the same composition. For example, the pore volume, surface area and density of the yellow oxide catalysts vary considerably from the corresponding red oxide catalysts. The weight percentages of the yellow iron oxide and potassium carbonate are especially critical in controlling the physical features of the catalyst produced. If the potassium content drops substantially below the preferred amount, thereby resulting in a corresponding rise in the iron oxide content, the catalyst has a much lower density, smaller surface area and larger pore volume. Whether the surface area, pore volume or catalyst density has anything to do with the results obtained is not known. It is known, however, that the yellow oxide catalysts containing from 55 to 70 percent by weight iron oxide, 30 to 40 percent by weight potassium carbonate and 1.5 to 5 percent by weight chromium oxide are superior to those of the prior art having the same composition when dehydrogenating olefins to diolefins.

The manner in which the catalysts are prepared is not extremely critical and depends to a large extent upon the composition of the catalyst being prepared. The catalysts, according to the present invention, containing a substantial amount of potassium carbonate are preferably prepared by dissolving part of the potassium carbonate in water to form a solution and subsequently adding a mixture of powdered yellow iron oxide, chromium oxide and potassium carbonate to the solution along with additional water, if necessary, to form a paste. The paste is extruded into pellets and dried for about one hour at a temperature of about 150 to 225° C. It is preferable that the catalyst then be calcined at about 600° to 650° C. for about ½ to 1½ hours to remove any water remaining; however, this may take place during the dehydrogenation reaction since the same temperatures are used under reaction operating conditions. The amount of water added in catalyst preparation is more critical when using yellow iron than with the red iron oxides due to the water of hydration. If too much water is added, the paste will be too thin and extrusion into pellets difficult. If desired, the catalyst components may be pressed into tablets instead of being extruded into pellets.

The size of the pellets produced may vary somewhat, catalysts having a diameter of from ⅛ to ¼" and from ⅛ to ⅝" in length being the most common. The smaller diameter catalysts are generally more active but are not as strong. Generally speaking, catalysts having a diameter of about 3/16" are usually employed.

It is preferable that the catalysts contain only iron oxide, potassium carbonate and chromium oxide as mentioned above. However, if desired, one may include other additives such as phosphates, silica, cements, etc., without departing from the scope of the invention.

The reactant feed may consist of anywhere from 2 to 20 moles of steam for every mole of olefin. The catalysts having higher potassium contents are usually operable at lower olefin to steam ratios. Generally speaking, a feed containing a molar ratio of steam to olefin of about 12 to 1 has been found satisfactory.

The dehydrogen is usually carried out at reaction temperatures of about 550° to 700° C. with temperatures of about 580 to 660° C. being preferred. However, higher or lower temperatures may be used without departing from the scope of this invention.

The use of atmospheric, subatmospheric or superatmospheric pressure broadly is comprised within the scope of this invention. However, it is preferable to operate at as low a pressure as is feasible and substantially atmospheric pressure is preferred.

The process of the invention may be carried out in batch, semi-continuous or continuous operation with continuous operation being preferred. The catalyst can be employed in the form of a fixed bed, or in fluidized or suspended form. It is preferable to utilize a fixed bed. The reaction may be carried out in single stage reactors or by dual staging in series reactors. The reactors may be of various designs, e.g., downflow reactors, radial reactors, etc.

The contact time of the reactant gas with the catalyst is usually defined in terms of gas hourly space velocity (volumes of reactant per volume of catalyst per hour, i.e., GHSV). The GHSV according to the present invention may vary from about 100 to 3000 and is preferably adjusted within this range to effect the degree of conversion desired for the particular feed in question.

Example I

This example is illustrative of the general method used in the preparation of the catalysts of this invention. A powdered mixture consisting of 500 pounds of a yellow oxide containing about 13 percent by weight water of hydration, 16 pounds of chromium oxide and 145 pounds of potassium carbonate was added to a solution consisting of 109 pounds of potassium carbonate dissolved in water to form a new mixture. Enough water was added to this new mixture to form a paste of the proper consistency which paste was extruded through 3/16" dies and cut into pellets about ⅛ to ⅝" in length. The pellets were dried in a pan drier for about 60 minutes at a temperature of about 150° to 210° C. and then placed in an oven and calcined for about 30 to 120 minutes at a temperature of about 600° to 650° C. The resulting catalyst had a weight composition of about 62.5 percent by weight iron oxide, 35.3 percent by weight potassium chromate and 2.2 percent by weight chromium oxide.

Example II

The catalysts prepared according to Example I were compared with similar catalysts prepared by the same process using a red iron oxide in the place of the yellow iron oxide. The results of the comparison appear in the following table.

TABLE I

|  | Red Oxide | Yellow Oxide |
|---|---|---|
| Surface Area, m.$^2$/g | 2.0 | 3.8 |
| Particle Density, g./cc | 2.077 | 2.281 |
| Pore Volume cc./g | 0.204 | 0.148 |
| Crushing Strength, lbs | 20 | 20 |

It is to be noted that with the yellow oxide catalyst the pore volume varies inversely with the surface area. This is consistent with experimental results showing the majority of the pores in the yellow oxide catalyst to be in the 600 to 2000 A. range whereas in the red oxide catalyst the majority of the pores are in the 2000 to 3000 A. range.

EXAMPLE III

In order to show the superiority of the yellow iron oxide catalysts over those commonly used in the prior art, a run was made with a catalyst prepared from yellow iron oxide as described in Example I and compared with the production of a comparable red iron oxide catalyst of the same composition. Both catalysts contained 62.5 percent by weight iron oxide, 35.3 percent by weight potassium carbonate and 2.2 percent by weight chromium oxide and the pellets were 1/8" in diameter.

The results were obtained by feeding butylene to a reactor containing the yellow oxide catalyst at the rate of 500 GHSV along with steam at a molar ratio of steam to butylene of about 12 to 1. The pressure was essentially atmospheric and the temperature in the catalyst bed was maintained at about 620° C. After 20 hours of operation, the product gas samples were collected and analyzed to determine the yield of butadiene and the conversion and selectivity values for the reaction. The activity of the yellow oxide catalyst was compared to the activity of the red oxide catalyst operating under similar conditions.

TABLE II

|  | Yellow Oxide | Red Oxide |
| --- | --- | --- |
| Conversion | 35.6 | 30.4 |
| Selectivity | 80.4 | 81.3 |
| CS Value | 116.0 | 111.7 |
| Yield | 28.6 | 24.8 |

The difference in conversion between the two catalysts is especially noteworthy. Although the selectivity of the yellow oxide catalyst declined slightly, the yield of butadiene from butylene when using the yellow oxide catalyst increased 15.3% over that obtained when using the red oxide catalyst.

EXAMPLE IV

In order to confirm the results obtained in Example III, a run was made using a yellow iron oxide catalyst prepared from a different batch. The reaction conditions were identical to those of Example III. The results were as follows:

TABLE III

|  | Yellow Oxide | Red Oxide |
| --- | --- | --- |
| Conversion | 36.7 | 30.4 |
| Selectivity | 80.0 | 81.3 |
| CS Value | 116.7 | 111.7 |
| Yield | 29.4 | 24.8 |

These results confirm the fact that exceptionally high conversions can be obtained with little sacrifice in seelectivity when using the catalysts prepared from yellow iron oxide. The yield of butadiene is therefore increased substantially when using the novel yellow iron oxide catalysts.

EXAMPLE V

Identical catalysts having the weight composition and diameter given in Example I were prepared from yellow and red iron oxides according to Example I. These catalysts were placed in separate beds and fed with butylene at the rate of 500 GHSV. The molar ratio of steam to butylene was about 12 to 1 and the catalyst bed was operated at 620° C. at substantially atmospheric pressure. At the end of a 24-hours period the reactant feed was discontinued and the products collected and analyzed. The results were as follows:

TABLE IV

|  | Yellow Oxide | Red Oxide |
| --- | --- | --- |
| Conversion | 32.0 | 26.3 |
| Selectivity | 78.3 | 81.9 |
| CS Value | 110.3 | 108.2 |
| Yield | 25.0 | 21.6 |

The increase in butadiene yield using the 3/16" yellow oxide catalyst over that of the corresponding red oxide catalyst of the same composition was 15.7%.

I claim as my invention:

1. In a process for the dehydrogenation of an olefin to a diolefin comprising contacting the olefin and steam in a molar ratio of about 1:2 to about 1:20 with a catalyst containing about 55 to 70 percent by weight iron oxide, 30 to 40 percent by weight potassium carbonate and 1.5 to 5 percent by weight chromium oxide at a temperature of from about 550° to 700° C. the improvement which comprises using a catalyst prepared by combining yellow iron oxide, potassium carbonate and chromium oxide and water to form a paste, extruding the paste to form pellets and drying the pellets at an elevated temperature of from about 150 to about 225° C.

2. In a process for the dehydrogenation of butylene to butadiene comprising contacting butylene and steam in a molar ratio of about 1:2 to 1:20 with a catalyst containing about 55 to 70 percent by weight iron oxide, 30 to 40 percent by weight potassium carbonate and 1:5 to 5 percent by weight chromium oxide at a temperature of from about 550° to 700° C., the improvement which comprises using a catalyst prepared by combining yellow iron oxide, potassium carbonate, chromium oxide and water to form a paste, extruding the paste to form pellets and drying the pellets at an elevated temperature of from about 150° to about 250° C.

3. In a process for the dehydrogenation of butylene to butadiene comprising contacting butylene and steam in a molar ratio of about 1:2 to 1:20 with a catalyst containing about 62.5 percent by weight iron oxide, 35.3 percent by weight potassium carbonate and 2.2 percent by weight chromium oxide at a temperature of from about 580° to 660° C., the improvement which comprises using a catalyst prepared by combining mono-hydrated yellow iron oxide, potassium carbonate, chromium oxide and water to form a paste, extruding the paste to form pellets, drying the pellets and calcining them at a temperature of about 600° to 650° C.

4. A dehydrogenation catalyst containing about 55 to 70 percent by weight iron oxide, 30 to 40 percent by weight potassium carbonate and 1.5 to 5 percent by weight chromium oxide prepared by combining yellow mono-hydrated iron oxide, potassium carbonate, chromium oxide and water to form a paste, extruding the pellets into pellets, and drying the pellets at an elevated temperature of from about 150° to about 225° C.

5. A catalyst according to claim 4 wherein the catalyst has been calcined at about 600° to 650° C.

References Cited

UNITED STATES PATENTS

| 2,848,521 | 8/1958 | Polk | 260—680 |
| 2,866,790 | 12/1958 | Pitzer | 260—680 X |
| 2,891,956 | 6/1959 | Oberlin et al. | 260—669 X |
| 2,916,531 | 12/1959 | Armstrong et al. | 260—669 |
| 2,939,767 | 6/1960 | Martin | 23—200 |
| 2,990,432 | 6/1961 | Fleming et al. | 260—669 |

PAUL M. COUGHLAN, JR., *Primary Examiner.*